Feb. 9, 1960

J. L. RENNICK 2,924,650

SUPPRESSOR CIRCUIT

Filed Feb. 24, 1955

JOHN L. RENNICK
*INVENTOR.*

BY John J. Pederson

HIS ATTORNEY.

United States Patent Office 2,924,650

Patented Feb. 9, 1960

2,924,650

SUPPRESSOR CIRCUIT

John L. Rennick, Elmwood Park, Ill., assignor to Zenith Radio Corporation, a corporation of Delaware Application February 24, 1955, Serial No. 490,174

7 Claims. (Cl. 178—5.4)

This invention is directed to a new and improved suppressor circuit for effectively suppressing or deleting spaced time portions of an information signal such as a television signal. The invention is particularly valuable when applied to the chrominance channel of a color television receiver, and will be described in that connection.

Under present color television standards, periodically recurring color synchronizing signals are transmitted as a part of the composite color signal. These color synchronizing signals have a frequency equal to that of the subcarrier employed to convey color information and are in the same amplitude range as the chroma signals; as a consequence, translation of the color synchronizing signals, or color bursts as they are usually called, to the color demodulating system of the receiver is highly undesirable. In the first place, the color bursts may produce spurious effects in the picture if demodulated and applied to the image reproducer, although this direct result may be avoided by blanking the picture tube during retrace intervals. Retrace blanking, however, provides an incomplete solution to the problem. For example, in a receiver which utilizes D.C. restoration of the color signals, the demodulated color burst leads to incorrect D.C. restoration levels. In a receiver in which D.C. restoration is not employed, the demodulated color synchronizing signals frequently cause noticeable variations in the color values of the reproduced image, particularly in those areas intended to be reproduced essentially as shades of black and white.

It is a primary object of the invention to provide a new and improved suppressor circuit for effectively suppressing spaced time portions of an information signal.

It is a more specific object of the invention to provide a new and improved suppressor circuit for effectively deleting spaced time portions of the signal appearing in the output circuit of a wave-signal translating device without creating undesirable signal effects in that output circuit.

It is a further object of the invention to provide an efficient and economical circuit for effectively suppressing the color synchronizing signals in the chrominance channel of a color television receiver.

Thus, the invention is directed to a suppressor circuit which deletes spaced time portions of an information signal generated in the output circuit of a wave-signal translating device. A suppressor circuit constructed in accordance with the invention comprises a transformer, including primary and secondary windings, which is coupled to the output circuit of the wave-signal translating device. An electron-discharge device comprising a cathode, a control electrode and an output electrode is included in the circuit; the cathode and output electrodes of this tube are individually coupled to different windings of the transformer in signal-bucking relationship. Biasing means are provided for maintaining the electron-discharge device normally non-conductive. The circuit further includes means for applying a gating signal to the control electrode of the tube to render it conductive during spaced time intervals which are coincident with the spaced time portions to be deleted from the information signal.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like elements are identified by like numerals in each of the figures, and in which:

Figure 1:
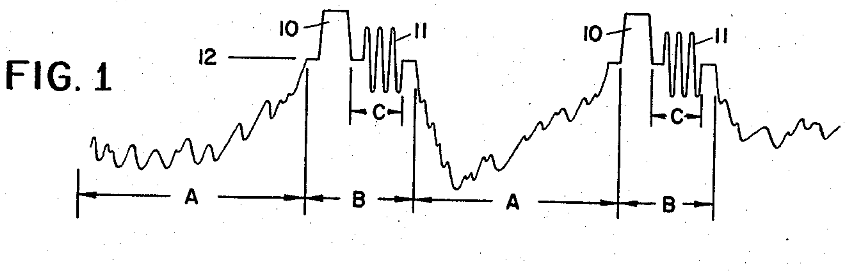
Figure 1 is a simplified diagrammatic representation of a color television signal according to current transmission standards.

Figure 1 shows the general type of signal waveform produced in transmitting color information according to present color television standards. The waveform may be considered to comprise two principal recurring spaced time portions A and B; portions A of the signal convey information relating to the brightness and color (hue and saturation) of an image, whereas portions B comprise the usual horizontal synchronizing pulses 10 and the color synchronizing signals or color bursts 11. In accordance with the standards, color synchronizing signals 11 have a frequency equal to that of the color subcarrier employed in transmitting chrominance information; these color bursts extend below the "black" level 12 of the signal into the same amplitude range as is employed for the information portions of the composite color signal. As explained above, it is the color bursts 11 included within the spaced time portions C of the signal which lead to errors in D.C. restoration level or in color rendition if applied to the color demodulating system of a receiver.

Figure 2:
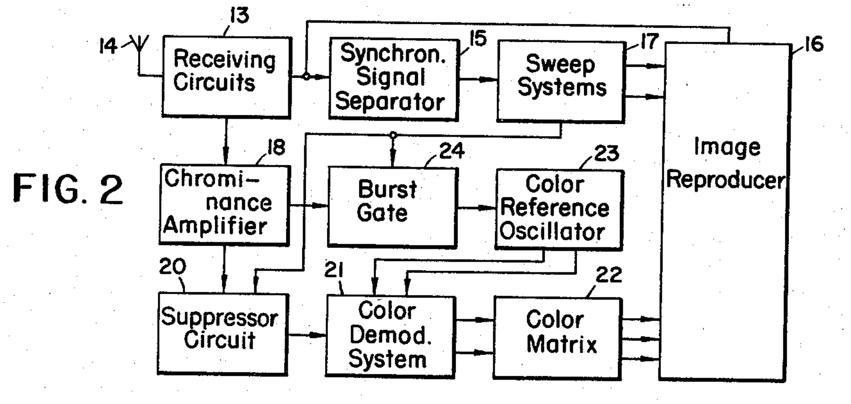
Figure 2 is a block diagram of a color television receiver including a suppressor circuit constructed in accordance with the invention.

The receiver shown in block diagram in Figure 2 comprises receiving circuits 13 coupled to an antenna 14; the receiving circuits may include the usual radio-frequency amplifier, first detector, intermediate-frequency amplifier, and second detector stages. Receiving circuits 13 are coupled to a synchronizing signal separator 15 of conventional construction and to an image reproducer 16 which may comprise a commercially available tri-color picture tube of the shadow-mask type or any other image-reproducing device adapted to reproduce an image in simulated natural color. Synchronizing signal separator 15 is coupled to the sweep systems 17 of the receiver which, in turn, are connected to image reproducer 16. Receiving circuits 13 are also coupled to a chrominance amplifier 18 of any desired number of stages; amplifier 18 is coupled to a suppressor circuit 20 and to a gating circuit 24. Suppressor 20 and gate 24 are also coupled to sweep systems 17. Suppressor circuit 20 is further coupled to a color demodulating system 21, and the output stages of the demodulating system are coupled to image reproducer 16 through a color matrix 22. The receiver further includes a color reference oscillator 23 coupled between synchronizing gating circuit 24 and demodulating system 21.

With the exception of suppressor circuit 20, the circuits of the color television receiver shown in Figure 2 are entirely conventional in construction and operation; consequently, they need not be described in detail here. Briefly, a color television signal of the form illustrated in Figure 1 modulated upon a transmission carrier is intercepted by antenna 14 and applied to receiving circuits 13; in the receiving circuits the signal is amplified and detected to reconstitute the composite color signal. This signal is applied to synchronizing signal separator 15; the separator segregates the horizontal and vertical sweep-synchronizing signals and supplies them to sweep systems 17 to develop suitable horizontal- and vertical-frequency scanning signals which are supplied to image reproducer 16. A horizontal-frequency signal is also supplied to suppressor circuit 20, as will be explained more completely hereinafter.

Luminance information is supplied to image reproducer 16 from receiving circuits 13; at the same time, the portion of the composite color signal relating to chrominance information is amplified in circuit 18 and translated to color demodulating system 21 through suppressor circuit 20. The demodulating system, which usually comprises a pair of synchronous detectors, utilizes the chrominance signal information and a color reference signal generated in oscillator 23 to develop a plurality of color difference signals which are supplied to color matrix 22; the frequency and phase of the reference signal from oscillator 23 are controlled by color-synchronizing signals supplied from burst gate 24. The color difference signals developed in demodulating system 21 may, for example, comprise the I and Q signals specified in the standards; in such case, these signals are additively combined in the requisite polarities in color matrix 22 to develop three primary color difference signals which are supplied to reproducer 16 to control the color values in the reproduced image.

If suppressor circuit 20 is omitted from the receiver of Figure 2 and chrominance amplifier 18 is coupled directly to demodulating system 21, the receiver is entirely conventional. In such a conventional receiver, the color values in the reproduced image may be distorted or the overall brightness level may be adversely affected by color synchronizing signals which are demodulated in system 21 and translated to image reproducer 16 as spurious color difference signals. This same effect, of course, is also present in other color television receivers of modified construction; the receiver of Figure 2 is intended only to present a typical environment in which suppressor circuit 20 may be put to advantageous use. For example, the suppressor circuit may be employed in a receiver in which luminance and color difference signals are combined to produce primary color signals before application to image reproducer 16; the same problems with respect to spurious signals developed by demodulation of the color bursts are present in these and other similar receivers.

Figure 3:
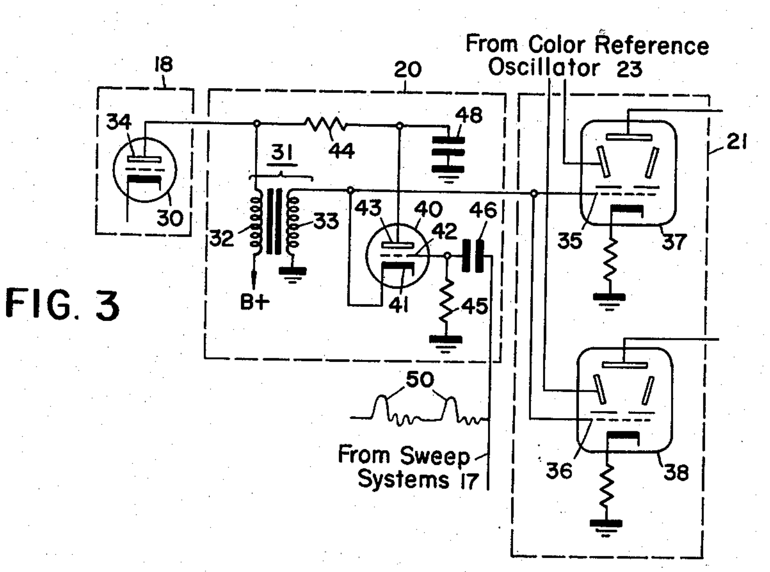
Figure 3 is a schematic diagram of a portion of the receiver of Figure 2, showing in detail a suppressor circuit constructed in accordance with the invention.

Figure 3 shows the specific circuitry of a typical embodiment of the invention. It comprises a wave-signal translating device 30, which may comprise a triode, pentode, or other tube and which may constitute the last stage of chrominance amplifier 18 of the receiver of Figure 2. The suppressor circuit itself comprises the components enclosed within dash outline 20; a portion of the color demodulating system 21 is also shown in detail. The particular color demodulating system illustrated is of the type described and claimed in the copending application of Robert Adler and John L. Rennick, Serial No. 355,476, filed May 18, 1953, which was abandoned in favor of continuation patent application Serial No. 505,476, filed May 2, 1955 and issued January 29, 1957 as Patent 2,779,818, which patent is now the subject of a re-issue application Serial No. 736,421, filed May 19, 1958, all of which are assigned to the same assignee as the present invention.

In the embodiment illustrated in Figure 3, suppressor circuit 20 comprises a transformer 31 including a primary winding 32 and a secondary winding 33. One terminal of primary winding 32 is connected to the anode 34 of tube 30 and the other terminal of the primary winding is connected to a suitable source of positive unidirectional operating potential B+. One end of secondary winding 33 is grounded and the other end of the secondary winding is connected to the control electrodes 35 and 36 of the two color demodulator tubes 37 and 38. The demodulator tubes shown are beam-deflection tubes of the type described in the above-mentioned Adler-Rennick patent and may, for example, be of the commercially available type 6AR8. It should be understood that any conventional demodulation system using triodes, pentodes, or other tubes may be substituted for the specific arrangement shown.

The suppressor circuit 20 comprises an electron-discharge device 40 including a cathode 41, a control electrode 42, and an anode 43. Cathode 41 is connected to that terminal of winding 33 which is coupled to demodulator grids 35 and 36. Anode 43 is coupled to primary winding 32 and to anode 34, preferably through a resistor 44; the anode is also bypassed to ground through a small capacitor 48. Thus, the anode-cathode discharge path of tube 40 is connected in series with both windings of transformer 31. Control electrode 42 is coupled to a suitable source of a suppressor signal in conventional manner by means of a coupling circuit comprising a coupling condenser 46 and a grid-leak resistor 45; in a receiver such as illustrated in Figure 2, the suppressor signal source comprises sweep systems 17. The impedances of resistor 45 and capacitor 46 are chosen to provide a time constant for the input circuit which is large in relation to the repetition period of the suppressor signal.

When the apparatus illustrated in Figure 3 is placed in operation, a suppressor signal comprising positive pulses 50 is applied to control electrode 42 of suppressor tube 40 through input circuit 45, 46. The self-biasing circuit 45, 46 maintains the tube nonconductive during time intervals corresponding to the periods between individual pulses. Consequently, during these intervals circuit 20 serves only as a passive coupling network and any signal appearing on anode 34 of tube 30 is translated through transformer 31 to control electrodes 35 and 36 of demodulator tubes 37 and 38. During the time intervals when pulses 50 are applied to the control electrode, however, tube 40 becomes conductive and the tube appears as a relatively low impedance path in shunt with the input circuit of demodulating system 21. Consequently, during these pulse time intervals, any chrominance signal components appearing at anode 34 are effectively suppressed.

At the same time, transformer 31 cannot operate to differentiate the positive impulse applied to control electrode 42 and apply the differentiated pulse to the demodulating system, since the tube current flows through both the primary and secondary windings of the transformer. In order to achieve effective cancellation of the gating or suppression signal in the transformer, it is necessary that anode 43 and cathode 41 of device 40 be coupled to the transformer windings in signal-bucking relationship, so that the current in each winding tends to oppose the field induced by the current in the opposite winding. This effect is an essential feature of the invention, since the differentiated pulses which would otherwise be developed in transformer 31 can adversely affect the operation of the demodulating system to the same extent as the color synchronizing signal itself.

When incorporated in the color television receiver of Figure 2, circuit 20 effectively translates chrominance information signals from amplifier 18 to demodulating system 21; that is, the spaced time portions A (Figure 1) of the color television signal are not substantially modified by the suppressor circuit. Positive-polarity impulses recurring at the horizontal sweep frequency are supplied to tube 40 of the suppressor circuit from sweep systems 17 to render tube 40 conductive during spaced time intervals coincident with spaced time portions C of the color information signal. Consequently, circuit 20 effectively deletes or suppresses the spaced time portions of the composite color signal comprising color synchronizing signals 11 and prevents translation of those synchronizing signals to color demodulating system 21. The suppressor signal comprising the positive polarity pulses from sweep systems 17 may include impulses of a somewhat longer duration, as for example horizontal retrace pulses coincident in phase with portions B of the signal illustrated in Figure 1, so that the sweep-synchronizing pulses 10 are also suppressed in the input signal to the demodulation system. The same effect can of course be achieved by interposing the suppressor circuit between successive stages of chrominance amplifier 18 or between receiving circuits 13 and the chrominance amplifier.

In coupling the suppressor device 40 to transformer primary 32, it is preferable to employ the resistor 44 and by-pass capacitor 48 rather than a direct connection without substantial impedance, since otherwise the suppressor circuit may become unstable and tend to oscillate. The particular coupling circuit 45, 46 employed to supply the suppressor signal to control electrode 42 is not critical and any suitable input circuit may be utilized.

The circuit parameters and tube types for a typical embodiment of the invention constructed in accordance with Figure 3 are set forth below; this material is presented merely by way of illustration and in no sense by way of limitation:

| | |
|---|---|
| Tube **30** | 6CB6 |
| Tube **40** | ½ 12AU7 |
| Tubes **37**, **38** | 6AR8 |
| Transformer **31** ratio | 1:1 |
| B+ | 280 volts |
| Resistor **44** | 10,000 ohms |
| Resistor **45** | 1 megohm |
| Capacitor **46** | 0.01 microfarad |
| Capacitor **48** | 30 micro microfarads |

The signal translating circuit of the invention effectively suppresses the color synchronizing signals without creating undesirable disturbances or oscillations in the input signal to the succeeding stage, demodulating system 21, and without adding an appreciable load to the preceding stage, chrominance amplifier 18. At the same time, the circuit is inexpensive and economical to construct. There is no necessity for special pulse-shaping circuitry for suppressor tube 40; the circuit provides satisfactory operation using a suppressor signal derived directly from the horizontal output transformer of the receiver.

While a particular embodiment of the present invention has been shown and described, it will be obvious to those skilled in the art that changes and modifications may be made without departing from the invention in its broader aspects. Accordingly, the aim in the appended claims is to cover all such changes and modifications as may fall within the true spirit and scope of the invention.

I claim:

1. A suppressor circuit for effectively suppressing spaced time portions of an information signal generated in the output circuit of a wave-signal translating device, said suppressor circuit comprising: a transformer, comprising a primary winding and a secondary winding, coupled to said output circuit of said wave-signal translating device; an electron-discharge device including a cathode, a control electrode, and an output electrode, said cathode and said output electrode being individually coupled to different ones of said windings in signal-bucking relationship; biasing means for maintaining said device normally non-conductive; and means for applying a gating signal to said control electrode to render said electron-discharge device conductive during spaced time intervals coincident with said spaced time portions of said information signal.

2. A suppressor circuit for effectively suppressing spaced time portions of an information signal generated in the output circuit of a wave-signal translating device, said suppressor circuit comprising: a transformer, comprising a primary winding and a secondary winding, coupled to said output circuit of said wave-signal translating device; an electron-discharge device including a cathode, a control electrode, and an output electrode, said cathode and said output electrode being individually coupled to said secondary and primary windings respectively in signal-bucking relationship; biasing means for maintaining said device normally non-conductive; and means for applying a gating signal to said control electrode to render said electron discharge device conductive during spaced time intervals coincident with said spaced time portions of said information signal.

3. A suppressor circuit for effectively suppressing periodic spaced time portions of an information signal generated in the output circuit of a wave-signal translating device, said suppressor circuit comprising: a transformer, comprising a primary winding and a secondary winding, coupled to said output circuit of said wave-signal translating device; an electron-discharge device including a cathode, a control electrode, and an output electrode, said cathode and said output electrode being individually coupled to different ones of said windings in signal-bucking relationship; biasing means for maintaining said device normally non-conductive; and gating means, comprising a source of periodic positive-potential impulses, coupled to said control electrode to render said electron-discharge device conductive during spaced time intervals coincident with said spaced time portions ol said information signal.

4. In a color television receiver for utilizing a color television signal including periodically recurring color synchronizing signals, a suppressor circuit for effectively suppressing said color synchronizing signals in the output circuit of a wave-signal translating device, said suppressor circuit comprising: a transformer, comprising a primary winding and a secondary winding, coupled to said output circuit of said wave-signal translating device; an electron-discharge device including a cathode, a control electrode, and an output electrode, said cathode and said output electrode being individually coupled to different ones of said windings in signal-bucking relationship; biasing means for maintaining said device normally non-conductive; and means for applying a gating signal to said control electrode to render said electron-discharge device conductive during spaced time intervals coincident with said color synchronizing signals.

5. In a color television receiver for utilizing a color television signal including periodically recurring color synchronizing signals, said receiver including a chrominance amplifier coupled to a color demodulating system, a suppressor circuit for effectively suppressing said color synchronizing signals in the output circuit of said chrominance amplifier, said suppressor circuit comprising: a transformer, comprising a primary winding and a secondary winding, coupled to said output circuit of said chrominance amplifier; an electron-discharge device including a cathode, a control electrode, and an output electrode, said cathode and said output electrode being individually coupled to said secondary and primary windings respectively in signal-bucking relationship; biasing means for maintaining said device normally non-conductive; and means for applying a gating signal to said control electrode to render said electron-discharge device conductive during spaced time intervals coincident with said color synchronizing signals.

6. In a color television receiver for utilizing a color television signal including periodically recurring color synchronizing signals, said receiver comprising a chrominance amplifier and a color demodulating system, a chrominance signal translating circuit comprising: a transformer, comprising a primary winding and a secondary winding, intercoupling said chrominance amplifier and said color demodulating system; an electron-discharge device including a cathode, a control electrode and an anode, said cathode and said anode being individually connected to said secondary and primary windings respectively in signal-bucking relationship; biasing means for maintaining said device normally non-conductive; and means for applying to said control electrode gating pulses recurring in time coincidence with said color synchronizing signals to render said electron-discharge device conductive during intervals in which said color synchronizing signals occur in said color television signal and prevent translation of said color synchronizing signals to said demodulating system.

7. A suppressor circuit for effectively suppressing spaced time portions of an information signal generated in the output circuit of a wave-signal translating device, said suppressor circuit comprising: a transformer, comprising a primary winding and a secondary winding, coupled to said output circuit of said wave-signal translating device; an electron-discharge device including a cathode, a control electrode, and an output electrode, said device being coupled to said transformer with the cathode-output electrode discharge path thereof in series with both of said windings; biasing means for maintaining said device normally non-conductive; and means for applying a gating signal to said control electrode to render said electron-discharge device conductive during spaced time intervals coincident with said spaced time portions of said information signal.

References Cited in the file of this patent

UNITED STATES PATENTS

| | | |
|---|---|---|
| 2,681,379 | Schroeder | June 15, 1954 |
| 2,692,908 | Van Jepmond | Oct. 26, 1954 |
| 2,751,431 | Kennedy | June 19, 1956 |